United States Patent
Zhang et al.

(10) Patent No.: US 8,918,115 B2
(45) Date of Patent: Dec. 23, 2014

(54) METHOD AND LOCATION SERVER FOR DETERMINING A POSTION OF A TARGET DEVICE

(75) Inventors: Lai-Jun Zhang, Beijing (CN); Li-Jun Chang, Beijing (CN); Wen-Feng Ma, Chengdu (CN)

(73) Assignee: Motorola Mobility LLC, Libertyville, IL (US)

( * ) Notice: Subject to any disclaimer, the term of this patent is extended or adjusted under 35 U.S.C. 154(b) by 569 days.

(21) Appl. No.: 12/770,193

(22) Filed: Apr. 29, 2010

(65) Prior Publication Data

US 2011/0059751 A1 Mar. 10, 2011

Related U.S. Application Data

(60) Provisional application No. 61/241,061, filed on Sep. 10, 2009.

(51) Int. Cl.
*H04W 24/00* (2009.01)
*G01S 19/48* (2010.01)
*H04W 64/00* (2009.01)

(52) U.S. Cl.
CPC .............. *G01S 19/48* (2013.01); *H04W 64/00* (2013.01)
USPC .................. 455/456.1; 455/456.2; 455/456.3

(58) Field of Classification Search
CPC ....... H04W 4/02; H04W 4/025; H04W 64/00; H04W 64/003; H04W 4/027; G01S 19/42; G01S 19/05; G01S 19/28; G01S 19/14; G01S 19/23
USPC ............ 455/456.1, 456.2, 456.3; 342/357.25, 342/357.31, 357.42
See application file for complete search history.

(56) References Cited

U.S. PATENT DOCUMENTS

2008/0228654 A1* 9/2008 Edge .............................. 705/71
2012/0129551 A1* 5/2012 Islam ........................ 455/456.1

FOREIGN PATENT DOCUMENTS

CN 101038335 A 9/2007
WO WO0148506 A2 7/2001

OTHER PUBLICATIONS

OMA-AD-SUPL-VI_0-20070615-A, Year 2007, Jun. 15, 2007; Open Mobile Alliance.*
OMA Open Mobile Alliance: "Secure User Plane Location Architecture", Approved Version 1.0—Jun. 15, 2007, Open Mobile Alliance OMA-AD-SUPL-VI_0-20070615-A, all pages.
Chinese Office Action for CN 201010284380.8 mailed Jun. 24, 2014.

* cited by examiner

*Primary Examiner* — Inder Mehra
(74) *Attorney, Agent, or Firm* — Morris & Kamlay LLP

(57) ABSTRACT

A method and location server (120) enable determining a position of a target device (105). The method includes receiving at the location server (120), from the target device (105), a distance message identifying a relative distance between the target device (105) and one or more base stations (115). Next, it is determined at the location server (120) that a primary positioning method is unavailable. In response to the primary positioning method being unavailable, a position of the target device (105) is determined using both a) an alternative positioning method and b) the relative distance between the target device (105) and the one or more base stations (115) that was identified in the distance message.

16 Claims, 4 Drawing Sheets

METHOD AND LOCATION SERVER FOR DETERMINING A POSTION OF A TARGET DEVICE

FIELD OF THE DISCLOSURE

The present invention relates generally to location services for portable electronic devices, and in particular to determining a position of a target device when a primary positioning method is unavailable.

BACKGROUND

Mobile telephones and other portable electronic devices increasingly include a locating feature that enables a current geographic location of the devices to be either displayed on the devices or transmitted to a remote receiver. These features are generally called location services (abbreviated as LCS, for "LoCation Services"). LCS features that display location coordinates on a device are useful, for example, to device users who need to know where they are located relative to geographic map coordinates. Thus, LCS features can enable a device user to initiate a location request where the device acts as a Global Positioning System (GPS) terminal. Also, location requests may be initiated by third parties and transmitted to a device over a wireless network. Such third party requests are useful in various circumstances. For example, mobile telephone networks may be able to improve network efficiency and provide better Quality of Service (QoS) and roaming rates to a mobile user if the network can periodically monitor a mobile telephone location. Also, emergency services can sometimes save lives by rapidly and accurately identifying where emergency phone calls have originated. Other useful location-based services and data that can be provided through portable electronic devices include maps, weather forecasts, traffic data and local news.

Various locating technologies can be used to determine the location of a portable electronic device. For example, GPS satellites can be used to identify a location anywhere in the world of some mobile telephones. Further, because mobile telephones are already operatively connected to land-based network stations, the stations can transmit GPS satellite orbit parameters and navigation data to mobile telephones to aid fast acquisition of GPS satellites when a mobile telephone first starts its GPS function. Thus Assisted GPS (AGPS) services are commonly used to incorporate better and more efficient location services into mobile telephones. Secure User Plane Location (SUPL) is a technology developed by the Open Mobile Alliance (OMA) that concerns the transfer of assistance data and positioning data between a portable electronic device and a location platform, and includes standards such as the Open Mobile Alliance Secure User Plane Location 2.0 Periodic Trigger standard. A "user plane" means that assistance data and positioning data are transmitted between the device and the location platform over a conventional wireless communication channel such as a General Packet Radio Service (GPRS) channel. User plane communications are thus distinguished from control plane communications where assistance data and positioning data are transmitted between a device and a location platform over a packet switched (PS) channel in a network.

Other SUPL applications include monitoring the position of one or more mobile devices from a remote location. For example, a dispatch center of a delivery company or a command station of an emergency response team may need to monitor the location of individuals or vehicles in the field. In such applications the dispatch center or command station is referred to as an LCS client, and monitored electronic devices are referred to as target SUPL Enabled Terminals (SETs). The LCS client receives location data concerning a SET indirectly through a SUPL location server.

A SUPL location server generally must be able to communicate directly with at least four overhead satellites to be able to calculate an accurate AGPS position of a SET. Where communications with fewer or no satellites is possible, such as indoors or in "urban canyon" environments, a SUPL server will employ an alternative positioning method, such as a cell-identification method. However, such an alternative positioning method may be unacceptably inaccurate for many applications.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
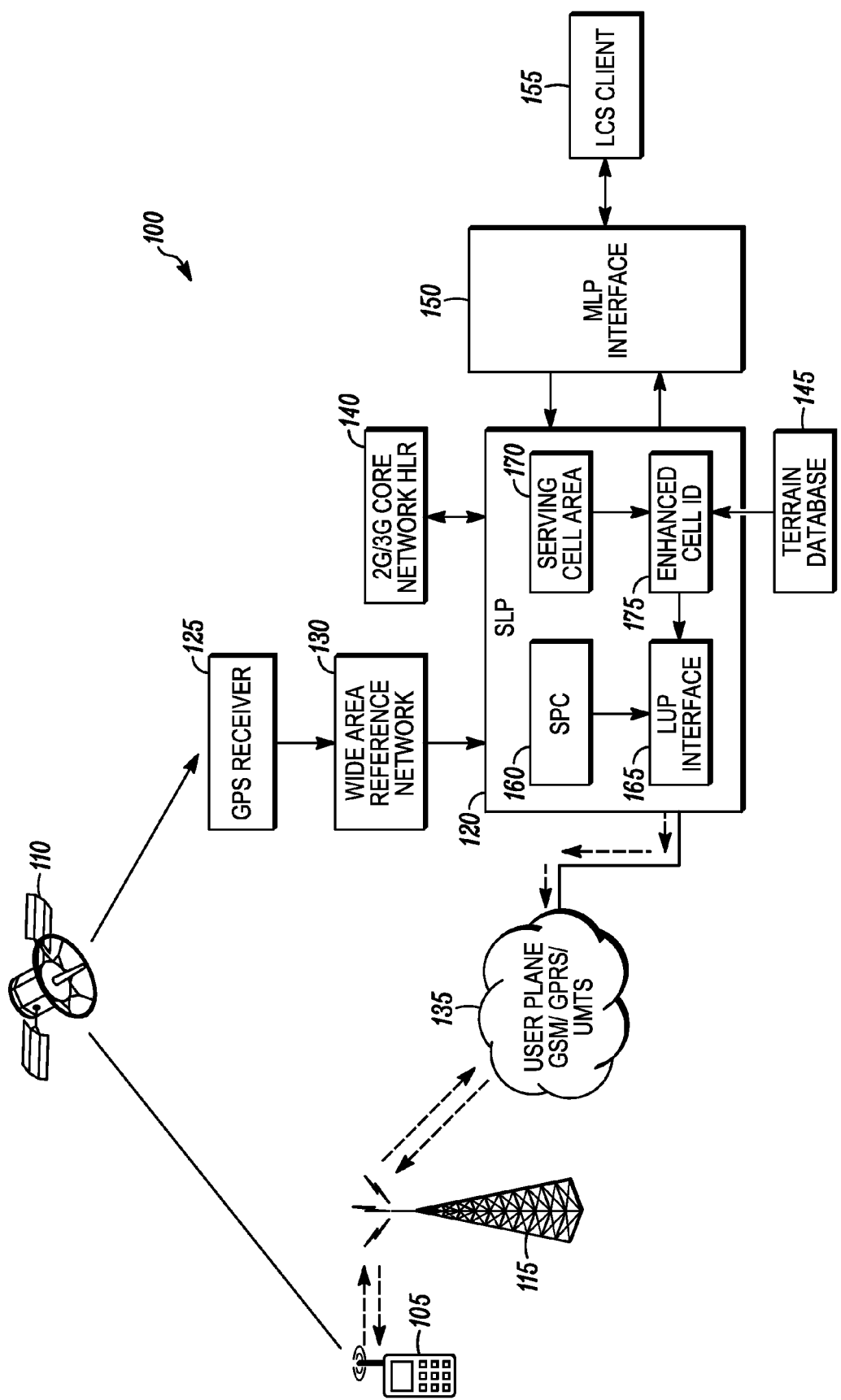
FIG. 1 is a schematic diagram illustrating a wireless communication network that provides location services, according to an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

According to some embodiments of the present invention, a method enables determining a position of a target device. The method includes receiving at a location server, from the target device, a distance message identifying a relative distance between the target device and one or more base stations. Next, it is determined at the location server that a primary positioning method is unavailable. In response to the primary positioning method being unavailable, a position of the target device is determined using both a) an alternative positioning method and b) the relative distance between the target device and the one or more base stations that was identified in the distance message.

Embodiments of the present invention thus enable a location server to significantly improve the accuracy of a position determination of a target device when a primary positioning method is unavailable. Primary positioning methods, such as AGPS, are often unavailable in indoor or covered environments or in urban canyons or mountain regions, where a location server is prevented from receiving strong GPS signals from a required number of satellites. In such environments, embodiments of the present invention enable a hybrid positioning method to be used to determine the position of the target device with greater accuracy than presently used alternative positioning methods.

Referring to FIG. 1, a schematic diagram illustrates a wireless communication network 100 that provides location services, according to an embodiment of the present invention. A target SET 105 in the form of a mobile telephone is in radio frequency (RF) communication with a satellite 110 and a cell tower 115. The satellite 110 is in communication with a location server 120 in the form of a SUPL location platform (SLP) through a GPS receiver 125 and a wide area reference network 130. The cell tower 115 is also in communication with the location server 120 through a user plane 135. The location server 120 is further operatively connected to a home location register (HLR) 140 of the target SET 105, a terrain database 145, and a mobile location protocol (MLP) interface 150 that interfaces with an LCS client 155. As will be understood by those having ordinary skill in the art, the LCS client 155 can be any device or system that requests the services of the location server 120, such as another mobile telephone, computer, or computer server.

The wide area reference network 130 is operatively coupled to a SUPL positioning center 160, which interacts with a location user plane (LUP) interface 165. The LUP interface 165 is used to deliver messages to and from the SET 105 for SUPL service management and SUPL positioning determination.

A serving cell area processing block 170 processes information concerning a serving cell area in which the target SET 105 operates. Further, an enhanced cell identification (ID) processing block 175 estimates the position of the target SET 105 based on an identification of the serving cell area in which the target SET 105 operates.

SUPL location servers, such as the location server 120, support not only high-accuracy positioning methods (e.g., AGPS), but also a number of lower accuracy positioning methods such as cell ID, enhanced observed time difference (E-OTD), and observed time difference of arrival (OTDOA) methods. Of the above methods, the cell ID method has the lowest accuracy because it derives position estimates based only on known positions of cells/sectors within a cellular network.

SUPL technology does not define a positioning protocol, but rather it defines a protocol stack that is used to communicate between SUPL location servers and SETs. Table 1 below illustrates a typical protocol stack according to SUPL.

TABLE 1

| Positioning Protocol | Initiator | Network Type | Supported Positioning Method (ordered by relative accuracy) |
|---|---|---|---|
| RRLP | 3GPP | GSM | AGPS, EOTD, Cell-ID |
| RRC | 3GPP | WCDMA | AGPS, OTDOA, Cell-ID |

A radio resource location protocol (RRLP) that was initiated by the third generation partnership project (3GPP) is generally used in global system for mobile (GSM) networks. A radio resource control (RRC) protocol that was also initiated by the 3GPP is generally used in wideband code division multiple access (WCDMA) networks. As illustrated in Table 1, SUPL can support AGPS, EOTD and Cell-ID positioning methods when RRLP is used as a positioning protocol. Similarly, SUPL can support AGPS, OTDOA, and Cell-ID methods when RRC is used as a positioning protocol. From a perspective of a SUPL specification, each of the above positioning protocols is equivalent, and SUPL can use any of them for positioning.

In SUPL technology, the selection of a positioning protocol is not necessarily related to a network type. In practice, regardless of network type, operators of some mobile networks prefer to select the RRLP protocol as the positioning protocol of SUPL. Reasons for such a preference include a) that some SUPL specifications suggest that a GSM and/or WCDMA capable SET, and a SLP providing support for the SET, must support RRLP if AGPS or EOTD positioning methods are supported; and b) RRLP is a much simpler protocol than the RRC protocol.

Thus, where a mobile communication network operator selects RRLP as a positioning protocol, the supported positioning methods will be employed in the order shown in Table 1 (i.e., AGPS, EOTD and then Cell-ID). Generally, the AGPS algorithm will be successful if the SUPL location server is in view of not less than four satellites. If there are not enough satellites in view, or if an associated GPS signal is too weak, such as indoors, the RRLP will resort to an EOTD positioning method. However, if the relevant SET does not support the EOTD positioning method—as in the case of SETs operating in a WCDMA network—then the RRLP will resort directly to a Cell-ID method, which has very poor accuracy and which is unacceptable for many location services (LCS) applications. Furthermore, even where an EOTD positioning method is supported, it is significantly less accurate than an AGPS positioning method.

Figure 2:
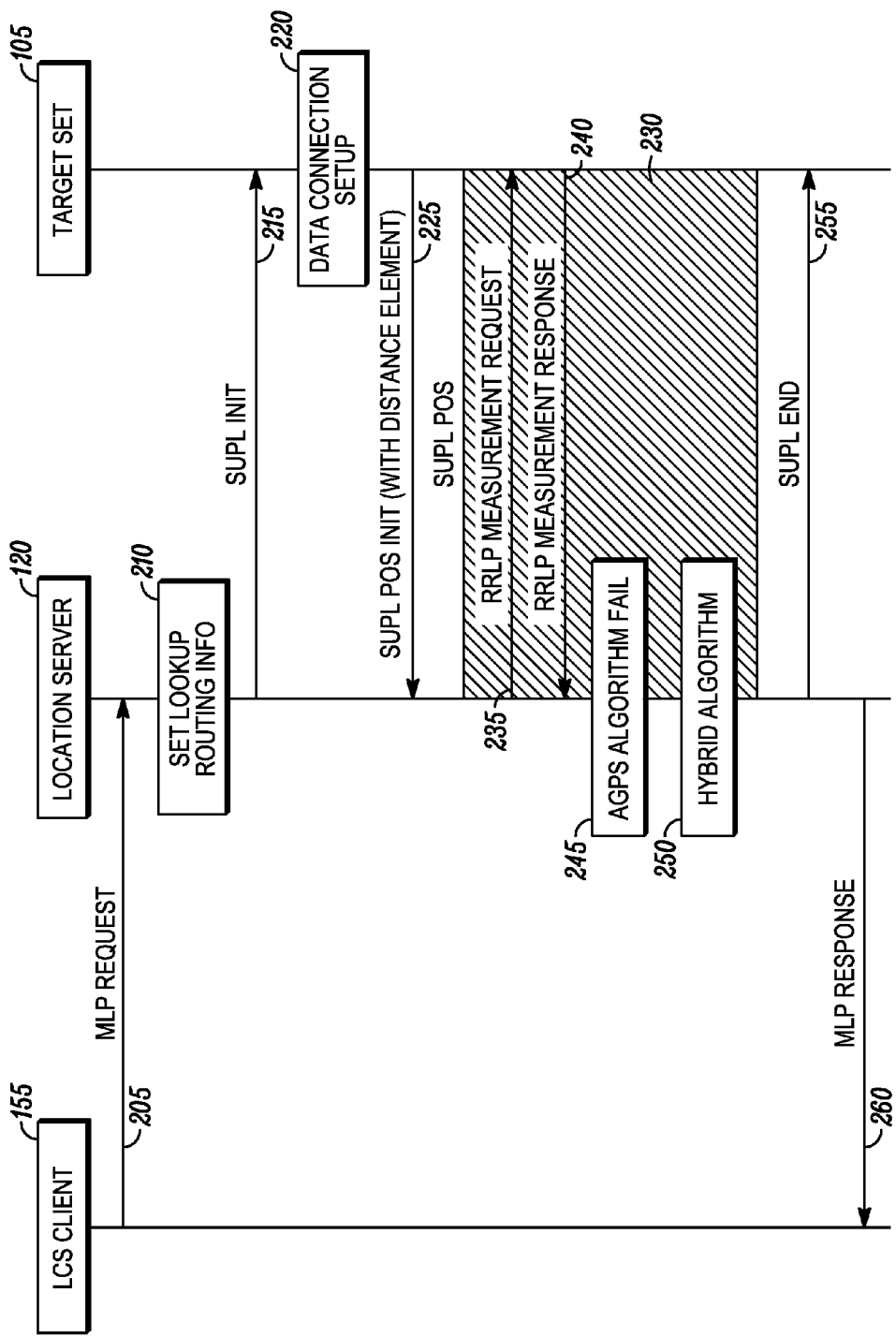
FIG. 2 is a message sequence chart illustrating a method for determining a position of a target device in a wireless communication network, according to an embodiment of the present invention.

Referring to FIG. 2, a message sequence chart illustrates a method for determining a position of a target device, such as the target SET 105, in the wireless communication network 100, according to an embodiment of the present invention. First, a mobile location protocol (MLP) request message 205 is transmitted from the LCS client 155 to the location server 120, and requests information about the location of the target SET 105. At block 210, the location server 120 completes a routing lookup process for the target SET 105. A SUPL initiation (INIT) message 215 is then transmitted from the location server 120 to the target SET 105, which message 215 initiates a network initiated SUPL positioning process.

The target SET 105 then completes a data connection setup process 220. According to some embodiments, the data connection setup process 220 determines a relative distance between the target SET 105 and one or more serving base stations, such as the cell tower 115. A SUPL position initiation (POS INIT) distance message 225, such as a SUPL Start message, is then transmitted from the target SET 105 to the location server 120, where the SUPL POS INIT distance message 225 includes a distance value that defines a relative distance between the target SET 105 and one or more base stations such as the cell tower 115.

For example, a distance value can be added to a SUPL position or additionalMeasurement parameter included in the SUPL POS INIT distance message 225 as follows:

```
Ver2-SUPL-START-extension ::= SEQUENCE {
    multipleLocationIds    MultipleLocationIds OPTIONAL,
    thirdParty    ThirdParty OPTIONAL,
    position  Position OPTIONAL,
    additonalMeasurement           AdditionalMeasurement OPTIONAL,
    ...}
Ver2-SUPL-POS-INIT-extension ::= SEQUENCE {
    multipleLocationIds       MultipleLocationIds OPTIONAL,
    utran-GPSReferenceTimeResult UTRAN-GPSReferenceTimeResult
OPTIONAL,
    utran-GANSSReferenceTimeResult    UTRAN-
GANSSReferenceTimeResult OPTIONAL,
    additonalMeasurement           AdditionalMeasurement OPTIONAL,
    ...}
```

As is known by those having ordinary skill in the art, the relative distance between the target device and the base station can be determined in various ways, such as by using an enhanced observed time difference (EOTD) technique. Also, as will be understood by those having ordinary skill in the art, the relative distance can comprise an actual distance value between the target device and a single base station, or a difference between the actual distance values between the target device and two base stations.

Further, it will be understood by those having ordinary skill in the art that the above example concerns networks such as global system for mobile (GSM) communication networks, wideband code division multiple access (WCDMA) networks, and time division synchronous-code division multiple access (TDS-CDMA) networks. Similar methods can be applied to other mobile communication networks, such as CDMA2000 and worldwide interoperability for microwave access (WiMax) networks.

Next, at block 230, a SUPL positioning (SUPL POS) process is initiated by the location server 120 and executed. The process includes the location server 120 transmitting an RRLP measurement request message 235 to the target SET 105, indicating that a position of the target SET 105 is requested. The target SET 105 then responds by sending an RRLP measurement response message 240 to the location server 120, which acknowledges the RRLP measurement request message 235. At block 245 the location server 120 then attempts to execute an AGPS algorithm. However, for purposes of illustrating the functioning of an embodiment of the present invention, consider that the AGPS algorithm fails. For example, the AGPS algorithm may fail because the target SET 105 is operating in an "urban canyon" environment where an inadequate number of satellites are in view. Therefore, at block 250, the location server 120 resorts to a high accuracy alternative positioning method. For example, rather than employing a low accuracy Cell-ID method, an AGPS hybrid algorithm is employed that uses available satellite data in combination with the distance value included in the SUPL POS INIT distance message 225.

Those having ordinary skill in the art will understand how such a distance value can be used with existing satellite data to estimate a current position of the target SET 105 that, although not as accurate as a position estimate determined using AGPS, is significantly more accurate than position estimates determined using other alternatives such as a Cell-ID positioning method.

After the SUPL POS process is completed, the location server transmits a SUPL END message 255 to the target SET 105, indicating that the SUPL POS process is completed. Also, an MLP response message 260, including the position estimate of the target SET 105 that was determined at block 250 using the hybrid algorithm, is transmitted to the LCS client 155.

Figure 3:
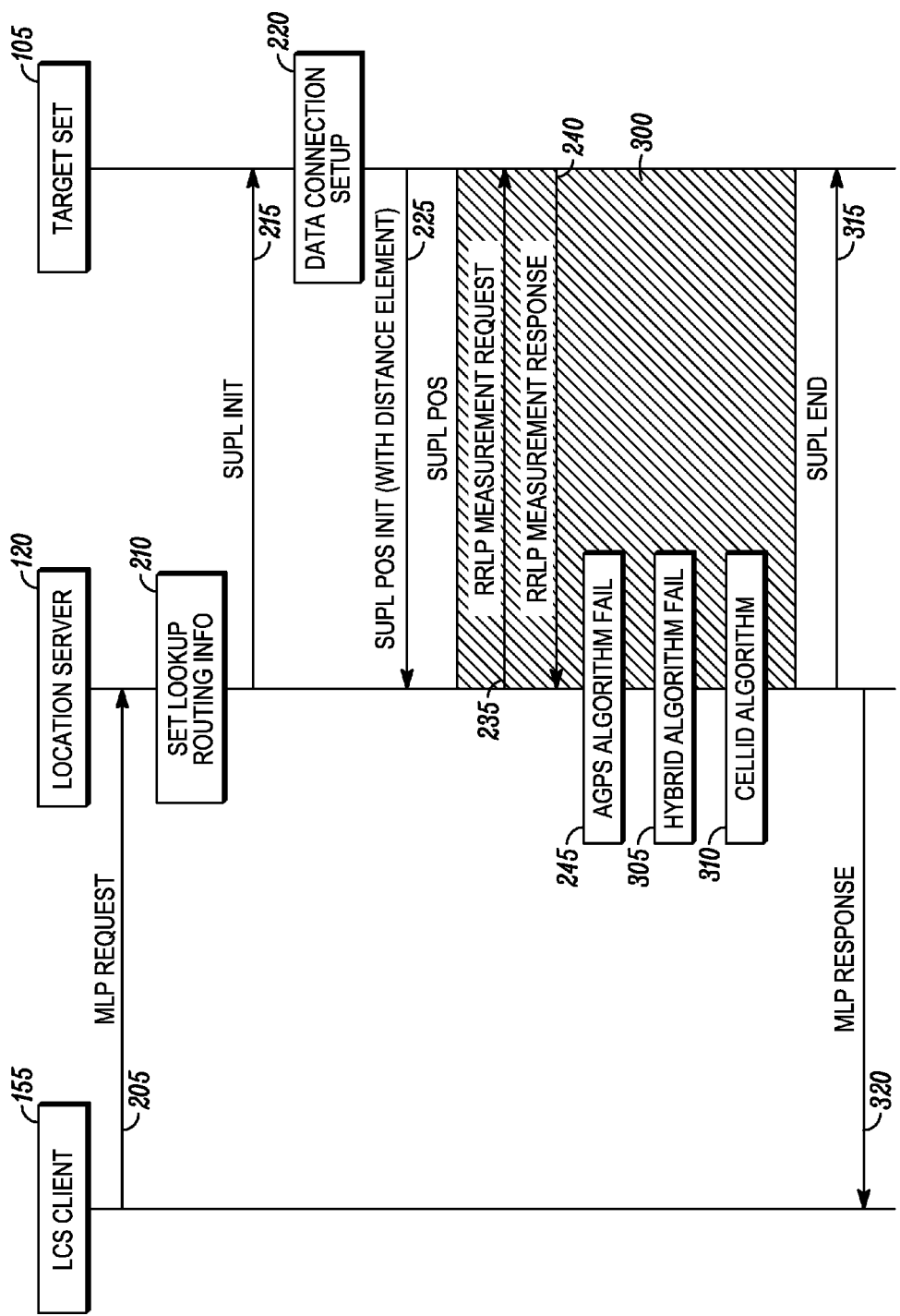
FIG. 3 is a message sequence chart illustrating a method for determining a position of a target device in a wireless communication network when both an AGPS algorithm and a hybrid algorithm fail, according to an embodiment of the present invention.

Referring to FIG. 3, a message sequence chart illustrates a method for determining a position of a target device, such as the target SET 105, in the wireless communication network 100 when both an AGPS algorithm and a hybrid algorithm fail, according to an embodiment of the present invention. In FIG. 3 the steps and processes defined according to reference numerals 205 through 245 proceed identically as described above; however, consider that during a SUPL POS process 300 the hybrid algorithm fails at block 305. For example, if no satellites are in view of the target SET 105, then neither an AGPS algorithm nor a hybrid algorithm can be used. Therefore, at block 310, the SUPL POS process 300 resorts to yet another alternative positioning method, such as a Cell-ID algorithm. A SUPL END message 315 is then sent from the location server 120 to the target SET 105, and an MLP response message 320, including a position estimate determined from the Cell-ID algorithm, is transmitted from the location server 120 to the LCS client 155.

Figure 4:
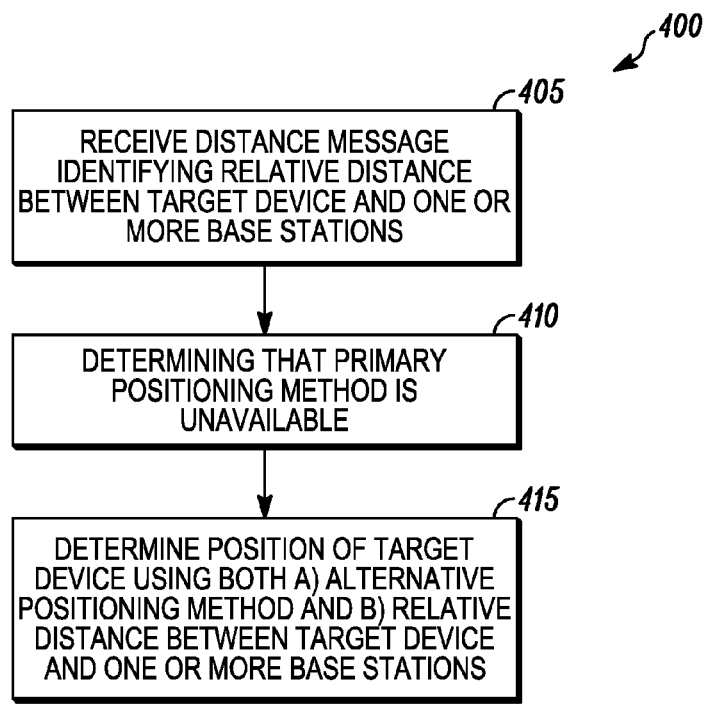
FIG. 4 is a flow diagram illustrating a method for determining a position of a target device, according to an embodiment of the present invention.

Referring to FIG. 4, a flow diagram illustrates a method 400 for determining a position of a target device, according to an embodiment of the present invention. At step 405, a distance message identifying a distance between the target device and a base station is received from the target device at a location server. For example, as shown in both FIG. 2 and FIG. 3, the SUPL POS INIT distance message 225 identifies a distance between the target SET 105 and the cell tower 115.

Next, at step 410, it is determined at the location server that a primary positioning method is unavailable. For example, as shown in both FIG. 2 and FIG. 3, at block 245 it is determined at the location server 120 that the AGPS positioning method is unavailable because the AGPS algorithm failed.

At step 415, in response to the primary positioning method being unavailable, a position of the target device is determined at the location server using both a) an alternative positioning method and b) the distance between the target device and the base station that was identified in the distance message. For example, as shown at block 250 in FIG. 2, the position of the target SET 105 is determined at the location server 120 using an alternative positioning method that employs a hybrid algorithm, and the hybrid algorithm uses the distance value included in the SUPL POS INIT message 225.

Figure 5:
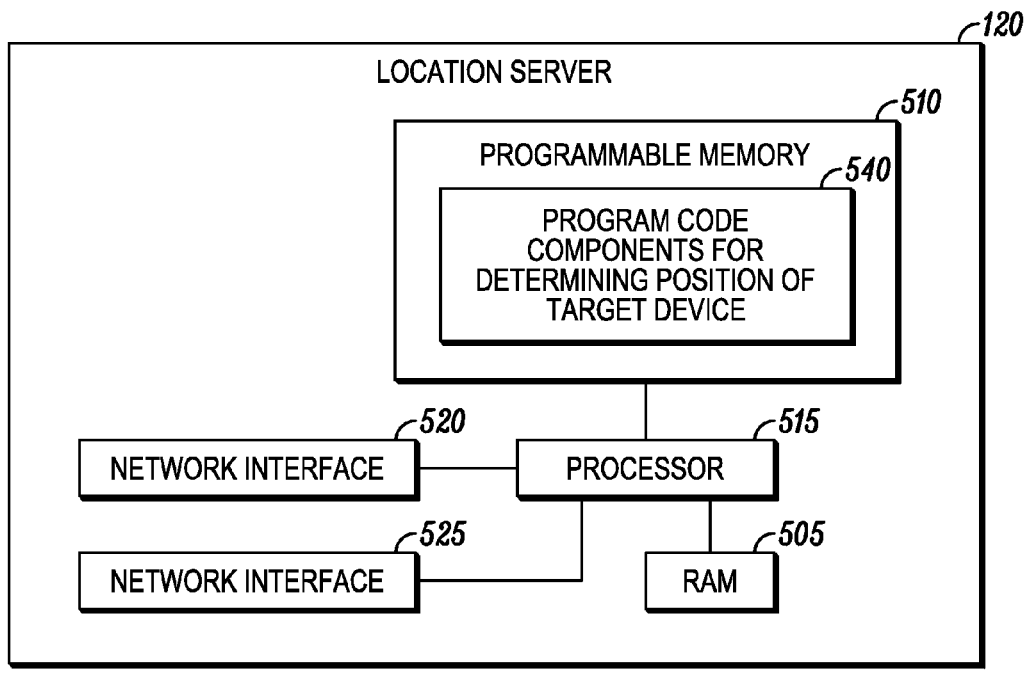
FIG. 5 is a block diagram illustrating components of a location server, according to an embodiment of the present invention.

Referring to FIG. 5, a block diagram illustrates components of the location server 120, according to an embodiment of the present invention. The location server 120, for example, can comprise a SUPL location platform (SLP) containing at least all the elements depicted in FIG. 5, as well as any other elements necessary for the location server 120 to perform its particular functions. Alternatively, the location server 120 can comprise a collection of appropriately interconnected units or devices, wherein such units or devices perform functions that are equivalent to the functions performed by the elements depicted in FIG. 5.

The location server 120 comprises a random access memory (RAM) 505 and a programmable memory 510 that are coupled to a processor 515. The processor 515 also has ports for coupling to network interfaces 520, 525. The network interfaces 520, 525 can be used to enable the location server 120 to communicate with other devices in various types of wired or wireless communication networks. For example the network interface 520 may communicate with the MLP interface 150 that enables the location server 120 to transmit MLP messages, such as the MLP request message 205, to the LCS client 155.

The programmable memory 510 can store operating code (OC) for the processor 515 and code for performing functions associated with a location server. For example, the programmable memory 510 can store computer readable program code components 540 configured to cause execution of a method, such as the method 400, for determining a position of a target device, as described herein.

Methods according to some embodiments of the present invention conform to the Open Mobile Alliance Secure User Plane Location 2.0 standard.

Wireless portable electronic devices, such as the target SET 105, that utilize and benefit from embodiments of the present invention can utilize various types of wireless network architectures including a mesh enabled architecture (MEA) network, or an Institute of Electrical and Electronics Engineers (IEEE) 802.11 network (e.g., 802.11a, 802.11b, 802.11g, 802.11n). It will be appreciated by those of ordinary skill in the art that such wireless communication networks can alternatively comprise any packetized communication network where packets are forwarded across multiple wireless hops. For example, such a wireless communication network can be a network utilizing multiple access schemes such as OFDMA (orthogonal frequency division multiple access), TDMA (time division multiple access), FDMA (Frequency Division Multiple Access), or CSMA (Carrier Sense Multiple Access).

Advantages of some embodiments of the present invention therefore include enabling a location server to significantly improve the accuracy of a position determination of a target device when a primary positioning method is unavailable. Embodiments of the present invention enable a hybrid positioning method to be used to determine the position of the target device with greater accuracy than presently used alternative positioning methods.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the present teachings. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, or contains a list of elements does not include only those elements but may include other elements not expressly listed or inherent to such process, method, article, or apparatus. An element preceded by "comprises a . . . ", "has a . . . ", "includes a . . . ", or "contains a . . . " does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and system described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:
1. A method for determining a position of a target device, the method comprising:
  receiving at a location server, from the target device, a distance message identifying a relative distance between the target device and one or more base stations;
  determining at the location server that an assisted global positioning system (AGPS) method is unavailable; and determining at the location server, in response to the AGPS method being unavailable, a position of the target device using available satellite data in combination with the relative distance between the target device and the one or more base stations that was identified in the distance message.

2. The method of claim 1, wherein the target device comprises a secure user plane location (SUPL) enabled terminal (SET).

3. The method of claim 2, wherein the location server is a SUPL server.

4. The method of claim 3, wherein the distance message comprises a SUPL POS INIT message transmitted to the SUPL server in response to a SUPL INIT message transmitted from the SUPL server to the SET.

5. The method of claim 3, wherein the distance message comprises a SUPL Start message.

6. The method of claim 1, wherein the relative distance between the target device and the one or more base stations is determined using an enhanced observed time difference (EOTD) technique.

7. The method of claim 1, wherein the distance message comprises a GsmCellInformation parameter that identifies the relative distance between the target device and the one or more base stations.

8. The method of claim 7, wherein the relative distance between the target device and the one or more base stations is provided as an integer value in the GsmCellInformation parameter.

9. A location server comprising:
a processor; and
a memory operatively coupled to the processor, wherein the memory comprises:
computer readable program code components for receiving at the location server, from the target device, a distance message identifying a relative distance between the target device and one or more base stations;
computer readable program code components for determining at the location server that an assisted global positioning system (AGPS) method is unavailable; and
computer readable program code components for determining at the location server, in response to the AGPS method being unavailable, a position of the target device using the relative distance between the target device and the one or more base stations that was identified in the distance message.

10. The location server of claim 9, wherein the target device comprises a secure user plane location (SUPL) enabled terminal (SET).

11. The location server of claim 10, wherein the location server is a SUPL server.

12. The location server of claim 11, wherein the distance message comprises a SUPL POS INIT message transmitted to the SUPL server in response to a SUPL INIT message transmitted from the SUPL server to the SET.

13. The location server of claim 11, wherein the distance message comprises a SUPL Start message.

14. The location server of claim 9, wherein the relative distance between the target device and the one or more base stations is determined using an enhanced observed time difference (EOTD) technique.

15. The location server of claim 9, wherein the distance message comprises a GsmCellInformation parameter that identifies the relative distance between the target device and the one or more base stations.

16. The location server of claim 15, wherein the relative distance between the target device and the one or more base stations is provided as an integer value in the GsmCellInformation parameter.

\* \* \* \* \*